W. C. LONGLEY.
CARCASS CONVEYER.
APPLICATION FILED OCT. 20, 1920.
1,408,372.  Patented Feb. 28, 1922.
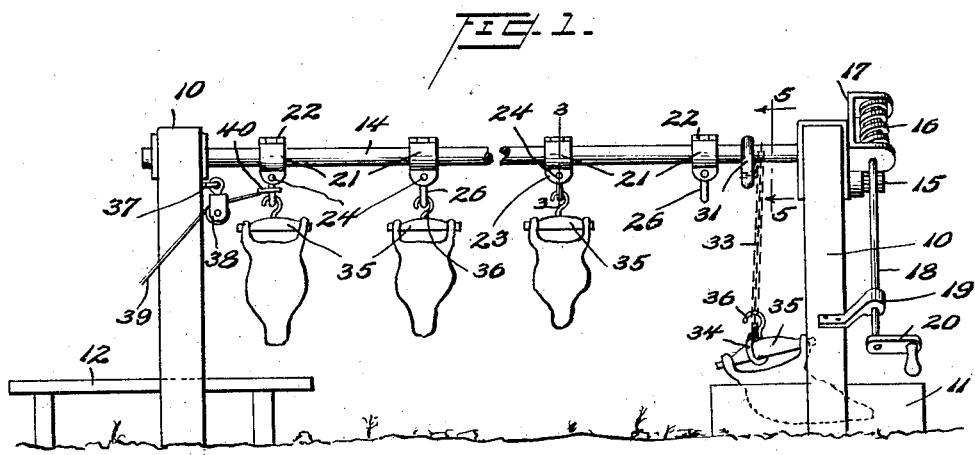
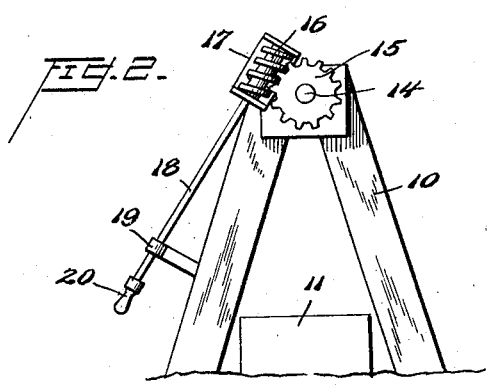
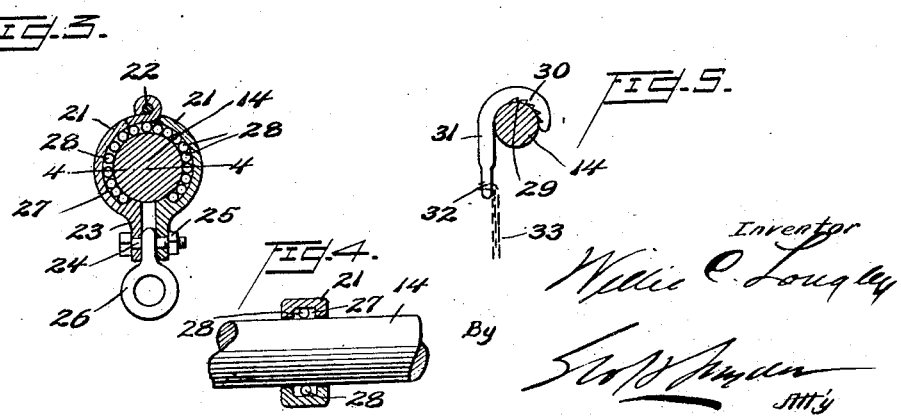
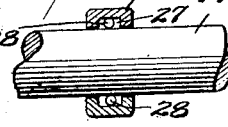

UNITED STATES PATENT OFFICE.

WILLIE CON LONGLEY, OF PENN LAIRD, VIRGINIA.

CARCASS CONVEYER.

1,408,372.　　　　Specification of Letters Patent.　　Patented Feb. 28, 1922.

Application filed October 20, 1920. Serial No. 418,308.

*To all whom it may concern:*

Be it known that I, WILLIE C. LONGLEY, a citizen of the United States, residing at Penn Laird, in the county of Rockingham and State of Virginia, have invented certain new and useful Improvements in Carcass Conveyers, of which the following is a specification.

This invention relates to butchering and has special reference to a carcass conveyer.

The principal object of the invention is to provide an improved general construction of device for conveying carcasses from a washing vat to a butchering table.

Another important object of the invention is the provision of a conveying means of this description wherein a rotatable shaft is arranged to serve a double purpose of a conveyer track and means to effect hoisting of a carcass from a washing vat.

A third important object of the invention is the provision of a novel carrier in a device of this character, the carrier being of a construction which will permit free rotation of the shaft while at the same time this carrier may move longitudinally of such shaft.

With the above and other objects in view as will be hereinafter apparent, the invention consists in general of certain novel details of construction and combinations of parts hereinafter fully described, illustrated in the accompanying drawings and specifically claimed.

In the accompanying drawings, like characters of reference indicate like parts in the several views, and:—

Fig. 1 is a side elevation of an apparatus constructed in accordance with this invention.

Fig. 2 is an end view thereof.

Fig. 3 is a large detail section on the line 3—3 of Fig. 1.

Fig. 4 is a large detail section on the line 4—4 of Fig. 3.

Fig. 5 is a large detail section on the line 5—5 of Fig. 1.

In carrying out this invention there is provided an inverted V-shaped frame 10 at each end of the device. One of these end frames straddles a washing or dipping vat 11 while the other, in like manner, straddles a butchering table 12. At the upper ends of these frames are mounted suitable bearings 13 wherein is journaled a free rotatable shaft 14. At one end of this shaft is provided a worm wheel 15 which is engaged by a worm 16 mounted in a housing 17. This worm 16 is furthermore mounted on a shaft 18 which passes angularly downward through a bearing 19 and is provided at its lower end with a suitable crank 20 so that a workman may rotate the worm 17 and thereby cause rotation of the shaft 14. Mounted on this shaft 14 is a series of carriers each of which consists of a pair of arcuate members 21 connected at their upper ends by a hinge 22. The lower ends of the members 21 are provided with lips or lugs 23 wherethrough passes a bolt 24 carrying a nut 25 so that by this means the members 21 are held in position around the shaft 14. It will be observed from Fig. 3 that when so positioned the lugs 23 are spaced and on the central portion of the bolt between said lugs is suspended an eye 26. Each of the members 21 is provided internally with a groove 27 and in these grooves are positioned balls 28 which contact with the shaft 14 and hold the members 21 spaced therefrom.

By means of this peculiar construction of the carriers the shaft can freely rotate within said carriers because of the ball bearings and at the same time the carriers can move longitudinally of the shaft also because of the presence of these ball bearings. Thus the ball bearings perform a double function.

Teeth 30 are formed on the inner side of the bill 29 of a hook 31 so as to engage the shaft 14 at any desired point, the teeth preventing rotation of the hook. This hook has its shank provided with an eye 32 and connected to this eye is a flexible hoisting element here shown as a chain 33, the chain carrying on its lower end a hook 34 engagable beneath an ordinary spandrel 35 provided with a hook 36.

On the frame 10 over the table 12 there is mounted an eye 37 carrying a block 38 through which runs a rope 39 having a hook 40 on its end. This hook 40 is engageable with one or the other of the carriers so that a carrier positioned near the vat 11 may be drawn by the rope 39 to a position over the table 12.

In the operation of the device the hook 31 is engaged on the shaft 14 and the hook 34 is engaged with a spandrel 35 as shown in Fig. 1. Then by rotating the crank 20 the shaft 14 is rotated. This causes rotation of the hook and winds the chain 33 up on the shaft 14 thus hoisting the carcass. The hook 36 of the spandrel is then engaged in the eye 26 so that the carcass is suspended from the shaft 14, the motion of the crank 20 being reversed to slacken the chain 33 for this purpose. Next the suspended carrier is drawn over by means of the rope 39 to the table 12 where it may be detached and allowed to fall on the table for butchering.

There has thus been provided a simple and efficient device of the kind described and for the purpose specified.

It is obvious that many minor changes may be made in the form and construction of this invention without departing from the material principles thereof. It is not therefore wished to confine the invention to the exact form herein shown and described, but it is wished to include all such as properly come within the scope claimed.

Having thus described the invention what is claimed as new is:—

1. In a device of the kind described, a rotatable shaft, carriers revolubly mounted on said shaft and arranged for movement longitudinally thereof, and means actuated by the rotation of the shaft for elevating a carcass to a position wherein it is engageable on a carrier.

2. In a device of the kind described, a rotatable shaft, carriers revolubly mounted on said shaft and arranged for movement longitudinally thereof, and detachable hoisting means carried by the shaft and actuated by the rotation thereof whereby to elevate a carcass to a position wherein it is engageable on a carrier.

3. In a device of the kind described, a rotatable shaft, carriers revolubly mounted on said shaft and arranged for movement longitudinally thereof, and detachable hoisting means carried by the shaft and actuated by the rotation thereof whereby to elevate a carcass to a position wherein it is engageable on a carrier, said hoisting means having a gripping surface for engaging the shaft.

4. In a device of the kind described, a rotatable shaft, carriers revolubly mounted on said shaft and arranged for movement longitudinally thereof, a hook fitting around the shaft and provided with teeth engaging the surface of the shaft, and a flexible hoisting element connected to the hook.

5. In a device of the kind described, a rotatable shaft, carriers revolubly mounted on said shaft and arranged for movement longitudinally thereof, said carriers including a ball bearing having its balls engaging said shaft to permit freedom of movement of the carrier relative to the shaft, and means actuated by the rotation of the shaft for elevating a carcass to a position wherein it is engageable on a carrier.

6. In a device of the kind described, a rotatable shaft, carriers revolubly mounted on said shaft and arranged for movement longitudinally thereof, said carriers including a ball bearing having its balls engaging said shaft to permit freedom of movement of the carrier relative to the shaft, and detachable hoisting means carried by the shaft and actuated by the rotation thereof whereby to elevate a carcass to a position wherein it is engageable on a carrier.

7. In a device of the kind described, a rotatable shaft, carriers revolubly mounted on said shaft and arranged for movement longitudinally thereof, said carriers including a ball bearing having its balls engaging said shaft to permit freedom of movement of the carrier relative to the shaft, and detachable hoisting means carried by the shaft and actuated by the rotation thereof whereby to elevate a carcass to a position wherein it is engageable on a carrier, said hoisting means having a gripping surface to engage the shaft.

8. In a device of the kind described, a rotatable shaft, carriers revolubly mounted on said shaft and arranged for movement longitudinally thereof, said carriers including a ball bearing having its balls engaging said shaft to permit freedom of movement of the carrier relative to the shaft, a hook fitting around the shaft and provided with teeth engaging the surface of the shaft, and a flexible hoisting element connected to the hook.

In testimony whereof I affix my signature.

WILLIE CON LONGLEY.